Feb. 6, 1968 J. SHAPIRO 3,368,164

HIGH FREQUENCY, HIGH POWER SOLID STATE GENERATOR

Filed May 21, 1965

INVENTOR

Jack Shapiro

BY Max L. Libman

ATTORNEY

United States Patent Office 3,368,164

Patented Feb. 6, 1968

3,368,164
HIGH FREQUENCY, HIGH POWER SOLID STATE GENERATOR

Jack Shapiro, 5 Lynn Drive, Englewood Cliffs, N.J. 07632

Filed May 21, 1965, Ser. No. 457,669
4 Claims. (Cl. 331—117)

ABSTRACT OF THE DISCLOSURE

A system for generating high power (up to megawatts) at frequencies in excess of ten kilocycles, by successively triggering a sequence of semiconductors such as silicon controlled rectifiers, which are, individually, low frequency devices, and combining all of their outputs into a single output circuit.

This invention relates to generation of high power, in the order ranging from tens of kilowatts to megawatts, at high frequency, e.g., in excess of ten kc., using semiconductors which are essentially low frequency devices in the present state of the art.

The generation of high frequency power by present types of transistors is limited to the range of several kilowatts, due to the limited voltage and current carrying capacity of presently available transistors. Silicon controlled rectifiers, on the other hand, can be employed in the high power range, but these are relatively slow devices, being limited in frequency conversion by the sum of delay time, rise time, conduction time, fall time, and recovery time. The total interval limits the present fastest units to frequency in the order of 7 kc., but units capable of this frequency do not have the high power-handling capability; the higher power units are correspondingly slower and have capacities in the region of 3 kc. or less. The present invention provides a system for enabling high power units to generate 20 kc. and higher, delivering megawatts of power at these frequencies. For a typical high power silicon controlled rectifier (hereinafter referred to as SCR), the total of the delay time and the rise time will constitute about 10 percent of the recovery time. In accordance with the present invention, each SCR is inactive during its long recovery period, and during this period other SCR's are operated, thus obtaining a sequence of cycles being delivered to the load, each such SCR operating for a short interval and then recovering while other units are operated.

High power, high frequency equipment in this range has application to communications and induction heating, and some types of welding. Present equipment for this purpose is both bulky and inefficient, and expensive both in initial cost and operation. The present system is capable of operation at efficiencies of over 95 precent, compared to present equipment in the 60 to 70 percent range, providing economical operation of such equipment. Another advantage of the present system is that it uses no moving parts, eliminating cooling problems by its high efficiency, is noiseless in operation, and operates on low voltage lines, eliminating high voltage transformers. The equipment can also be made considerably more compact than equipment of corresponding power ratings using moving parts.

The specific nature of my invention as well as other objects and advantages thereof will clearly appear from a description of a preferred embodiment as shown in the accompany drawings, in which.

Figure 1:
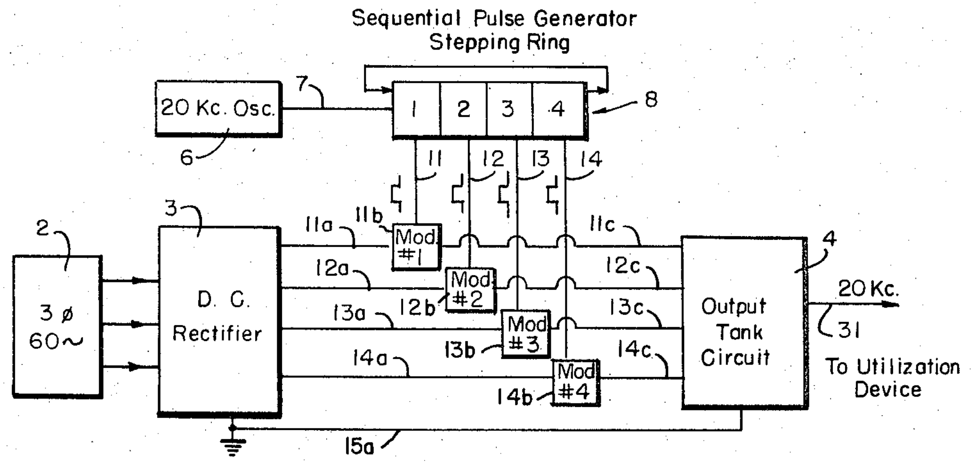
FIG. 1 is a block circuit diagram of the invention.
Figures 2, 3, 4, 5:
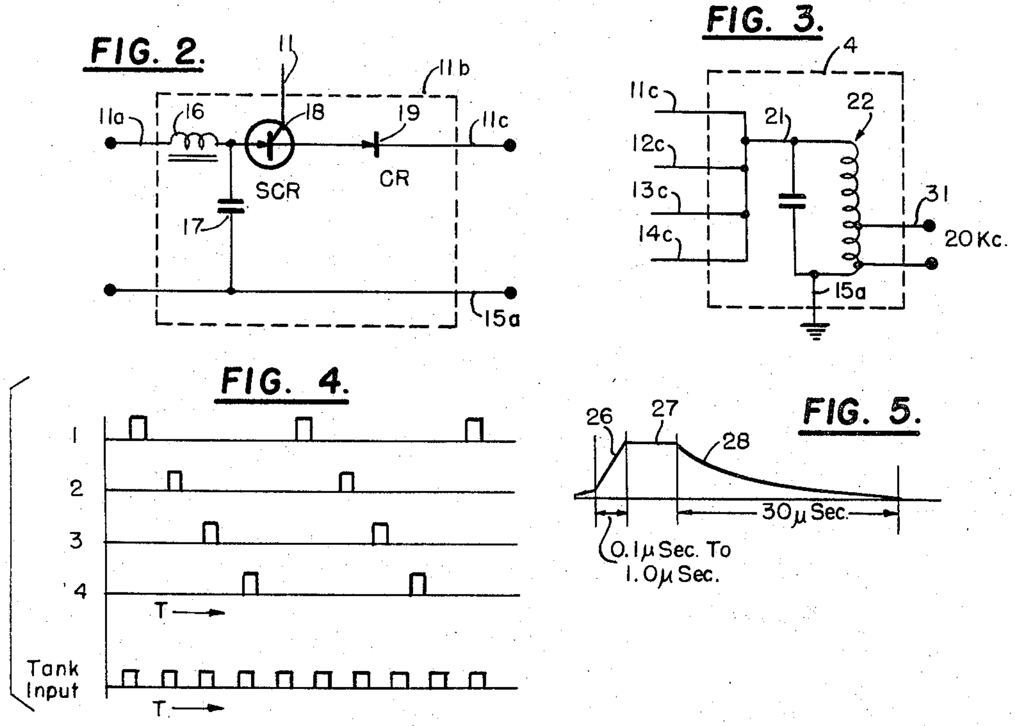
FIG. 2 is a circuit diagram of a typical modulator unit.
FIG. 3 is a schematic circuit diagram of the tank circuit.
FIG. 4 is a timing chart showing the relationship of the pulses produced.
FIG. 5 is a graph showing the time-delay characteristic of an SCR.

Referring to FIG. 1, commercial power is available from source 2, usually in the form of three-phase 60-cycle power, although the invention is also applicable to single-phase 60-cycle power supplies. It is desired to convert this low-frequency power to high-frequency power, in the order of 10–100 kc., and up to multi-megawatt power ratings. Such power has wide applications in modern induction heating and welding devices, and also in certain low-frequency radio communication systems. Commercial equipment is presently available for this purpose, using vacuum tube and rotary conversion, but such equipment is bulky, expensive, and relatively inefficient. The same result is obtained in the system shown in FIG. 1, in which 3 indicates a D.-C. rectifier system, which may be of any conventional type commercially available. The problem is now to convert this D.-C. into high-frequency, high-power A.-C. Assuming, for example, that it is desired to have the high-power output at a frequency of 20 kc., an output tank circuit is provided as indicated at 4, and shown in detail in FIG. 3, which has a resonant frequency of 20 kc. The desired power will be taken directly from the LC circuit of the tank, in which, as is well known, very large currents arise at the resonant frequency. The problem is to supply the tank circuit with pulses of correspondingly high energy at the resonant frequency, in this case, 20 kc. For this purpose, a 20 kc. oscillator 6 may be provided, preferably a crystal-controlled or other highly accurate oscillator providing a stable output at the tank circuit resonant frequency. This output is supplied on line 7 to a sequential pulse generator which may be in the form of a conventional stepping ring 8 arranged to sequentially supply an output pulse on each of lines 11, 12, 13 and 14 each time the ring is pulsed on line 7. Although the number of steps shown in the ring is four in this example, it will be understood that it may be any desired number, depending upon the frequency desired, and to an extent upon the time-delay characteristics of the SCR's which are used, and so forth. A corresponding number of output lines, in this case shown as four, are taken from the D.-C. rectifier 3, as indicated at **11*a*–14*a* respectively, and each of these goes to a different modulator 11*b*–14*b* respectively, which are all alike, and contain the circuit elements shown in FIG. 2, illustrated particularly in the case of modulator 11*b*. A reactive element, typically an inductor 16 is provided, which is designed for the required charging rate for storage capacitor 17, and to isolate the power supply 3 from the tank circuit 4 when the SCR 18 is conducting, which occurs when it is fired by a pulse arriving on line 11. When conduction occurs, the SCR operates similarly to a thyratron in that control circuit 11 can only initiate the conductive state, but cannot turn it off. The current transmitted by the SCR 18 is initially high due to the charge on the condenser, and falls off to a much lower value as the condenser is discharged, but does not cease until the voltage across the SCR reverses, which occurs upon the succeeding oscillation of the tank circuit 4. During the following three oscillations of the tank circuit, while the next three SCR's are similarly excited, condenser 17 is recharging through the inductance 16, and by the time the ring has come around again to stage No. 1, which it does as long as power is supplied to its input, the condenser is fully charged and ready to repeat the above-described operation. An ordinary diode rectifier of the fast recovery type, 19**, may be used to assist the recovery of the SCR control, and to prevent excessive reverse current through the SCR. However, under certain conditions of circuitry and SCR characteristics, this diode may be omitted.

As can be seen in FIGS. 3 and 4, the pulses produced in the respective lines 11*c*–14*c* corresponding to the operation of modulators Nos. 1–4 occur in a staggered sequence, and are so spaced that the cumulative input on line 21 to the resonant tank circuit 22 is at the proper frequency for maximum excitation of the tank circuit, i.e., a pulse should arrive during each positive (or negative) excursion of the tank circuit current. Although the pulses are shown as square pulses, they are preferably rounded off to a degree, as will occur naturally in any case, to minimize excessive harmonics. Ideally, of course, each pulse should have the sinusoidal form of a half-cycle of oscillation of the tank circuit, but in practice, sufficiently good results are obtained with reasonably rounded pulses of less width than the sinusoidal one-half cycle pulses of the resonant circuit.

FIG. 5 shows a typical characteristic curve of an SCR under operation conditions. Shortly after the leading edge of a trigger pulse arrives on line 11, for example, current begins to flow during the rise time 26, until it reaches the operating level shown at 27 which is determined largely by the load, and then begins to fall off as indicated at 28, as the charge of condenser 27 becomes exhausted. On the following cycle of oscillation of the tank circuit, the cathode is driven positive with respect to the anode and reverse current tends to flow, cutting off conduction of the SCR. However, the modulator must be allowed still further recovery and recharging time, which is provided by the above circuit, since the other SCR's are providing the input to the tank circuit until the stepping ring again energizes each particular unit.

Referring again to FIG. 3, the output circuit 31 is supplied directly from the resonant circuit, and can provide very large amounts of power at 20 kc., which is the desired purpose of the invention.

Figure 6:
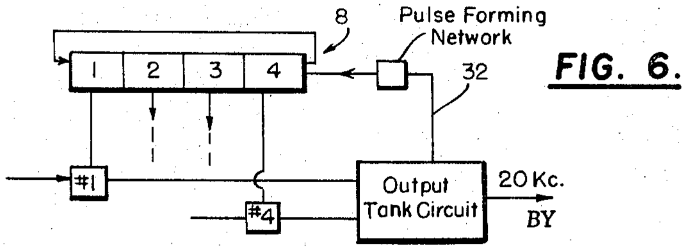
FIG. 6 is a partial block diagram showing a modification.

FIG. 6 shows a modification in which, instead of employing a 20 kc. oscillator 6 to step the stepping ring 8, it is stepped by an output on line 32 from the tank circuit. This ensures that the stepping operation is synchronized with the resonant frequency of the tank circuit and the frequency of the output is thus self-regulated. On the other hand, if a highly accurate 20 kc. oscillator 6 is used, this will tend to maintain the output of the tank circuit at exactly the desired frequency, for those situations where highly accurate output frequency is important, as may be the case in the communications field.

In some cases, e.g., induction heating apparatus, the resonant tank may be omitted and the pulses fed directly from line 21 to the work coil or other utilization circuit. It will be apparent that the circuit could be set up for push-pull operation so as to deliver both positive and negative pulses to the tank circuit.

It will be noted that each SCR can be operated at a peak current which greatly exceeds its average current, due to its low duty cycle, while the total average output of the SCR units is additive.

Instead of a stepping ring, the triggering pulses for the SCR's may be obtained from any other suitable source, e.g., a delay line, by known techniques, the only requirement being that such source is capable of emitting pulses to the SCR's in succession at the desired rate.

It will be apparent that the embodiments shown are only exemplary and that various modifications can be made in construction and arrangement within the scope of my invention as defined in the appended claims.

I claim:

1. A system for generating alternating current at high power and high frequency comprising:

(a) a high-powered source of direct current;

(b) a number, in excess of two, of silicon controlled rectifiers (SCR), each having a control terminal, each SCR capable of handling high power but having a recovery time much slower than the desired frequency, and each SCR being connected to said D.-C. source through an inductive element;

(c) a capacitor connected from a point between each inductance element and each SCR to ground, to store directly from the source of direct current, a charge at the D.-C. voltage;

(d) an output resonant tank circuit having a common input supplied sequentially by said SCR's at its resonant frequency;

(e) a source of spaced pulses at high frequency;

(f) means for supplying pulses from said source of spaced pulses successively to the control terminals of said SCR's to trigger the SCR's in succession at the resonant frequency of the tank circuit to discharge each capacitor through its respective SCR into the tank circuit;

(g) means for supplying a load circuit from the output of said tank circuit.

2. The invention according to claim 1, wherein said source of spaced pulses is a ring counter having a number of stages corresponding to the number of SCR's, with means for stepping said ring at the resonant frequency of the tank circuit.

3. The invention according to claim 2, said means for stepping the ring circuit being an oscillator and pulse generator circuit operating at the same frequency as the resonant frequency of the tank circuit.

4. The invention according to claim 2, said means for stepping the ring circuit being a connection to the tank circuit, whereby the ring is stepped directly at the tank resonant frequency.

References Cited

UNITED STATES PATENTS

| | | | |
|---|---|---|---|
| 3,323,076 | 5/1967 | Pelly | 331—117 |
| 3,192,464 | 6/1965 | Johnson et al. | 321—2 |
| 3,243,728 | 3/1966 | Brainerd et al. | 331—117 |
| 3,243,729 | 3/1966 | Olson et al. | 331—117 |
| 3,290,581 | 12/1966 | Hooper | 321—45 |

JOHN F. COUCH, *Primary Examiner.*

W. H. BEHA, *Assistant Examiner.*